United States Patent
Vogler et al.

(10) Patent No.: US 6,681,990 B2
(45) Date of Patent: Jan. 27, 2004

(54) ITEM TRACKING SYSTEMS AND REAL-TIME INVENTORY MANAGEMENT

(75) Inventors: Hartmut K. Vogler, Foster City, CA (US); Richard J. Swan, Portola Valley, CA (US); Tao Lin, Mountain View, CA (US); James Vrieling, Arvada, CO (US); R. Scott Beckett, Marietta, GA (US); Wouter Van der Veen, Den Haag (NL); Ye Chen, Sunnyvale, CA (US)

(73) Assignee: SAP Aktiengesellschaft, Walldorf (DE)

( * ) Notice: Subject to any disclaimer, the term of this patent is extended or adjusted under 35 U.S.C. 154(b) by 0 days.

(21) Appl. No.: 10/159,598

(22) Filed: May 31, 2002

(65) Prior Publication Data

US 2003/0222141 A1 Dec. 4, 2003

(51) Int. Cl.[7] .............................................. G06K 15/00
(52) U.S. Cl. ....................................................... 235/385
(58) Field of Search .......................................... 235/385

(56) References Cited

U.S. PATENT DOCUMENTS

| | | |
|---|---|---|
| 4,974,166 A | 11/1990 | Maney et al. |
| 5,166,884 A | 11/1992 | Maney et al. |
| 5,469,363 A | 11/1995 | Saliga |
| 5,936,527 A | 8/1999 | Isaacman et al. |
| 5,963,134 A | 10/1999 | Bowers et al. |
| 5,971,592 A | 10/1999 | Kralj et al. |
| 6,032,127 A | 2/2000 | Schkolnick et al. |
| 6,177,860 B1 | 1/2001 | Cromer et al. |
| 6,195,006 B1 | 2/2001 | Bowers et al. |
| 6,259,367 B1 | 7/2001 | Klein |
| 6,292,894 B1 | 9/2001 | Chipman et al. |
| 6,301,621 B1 | 10/2001 | Haverstock et al. |
| 6,321,230 B1 | 11/2001 | Joslin et al. |
| 6,493,678 B1 * | 12/2002 | Fostier ........................ 235/375 |
| 2001/0000019 A | 11/2000 | Bowers et al. |

FOREIGN PATENT DOCUMENTS

| | | |
|---|---|---|
| DE | 4341880 | 6/1995 |
| DE | 19623893 | 12/1997 |
| DE | 19844631 | 4/2000 |
| DE | 19951060 | 5/2000 |
| DE | 19955120 | 5/2001 |
| EP | 0908643 | 4/1999 |
| GB | 2308947 | 7/1997 |
| WO | WO 00/45324 | 8/2000 |
| WO | WO 02/47014 | 6/2002 |

OTHER PUBLICATIONS

Checkpoint Systems Inc., *Electronic Signatures technologies support supply chain logistics*, Retail News vol. 2, 2001.

(List continued on next page.)

*Primary Examiner*—Harold I. Pitts
(74) *Attorney, Agent, or Firm*—Fish & Richardson P.C.

(57) ABSTRACT

Methods and apparatus, including computer program products, to support real-time inventory management. Changes to the inventory including the addition or removal of an item from the inventory are reported to the item tracking system in real-time. An inventory planner normally operates on a periodic schedule to perform inventory management functions. The inventory planner can receive alerts from an early warning agent that can cause the inventory planner to perform at least some inventory management functions, outside of its normal periodic schedule. In particular, the agent can send an alert to the inventory planner to cause the inventory planner to determine whether replenishment of store inventory is needed. To make this determination, the inventory planner can retrieve real-time inventory data from the item tracking system.

11 Claims, 4 Drawing Sheets

OTHER PUBLICATIONS

Sanjay Sarma, *Auto–ID Center: Lessons Learned*, Auto–ID Center–MIT, Nov. 23, 2001.

Auto–ID Center Website –Technology Section, *Introduction to Auto–ID*, http://www.autoidcenter.org/technology, Jan. 7, 2002.

Sylvia Tiisetso Khabele, *RFID Security, CSC400W: Network and Internetwork Security*, skhabele@cs.uct.ac.za, May 18, 2001.

Kevin R. Sharp, Senior Technical Editor, IDSystems.com, *Planning for RFID Ubiquity*, http://www.idsystems.com/reader/2000 07/plan0700.htm, Jul. 2000.

Raghu das et al., *The Internet of Things*, IDTechEx Ltd., http://www.idtechex.com/book9.html, 2001.

David L. Brock, *The Physical Markup Language*, MIT Auto–ID Center, Feb. 2001.

George Cole, *The little label with an explosion of applications*, Financial Times–FT.com, http://news.ft.com/ft/gx.cgi/ftc?pagename=View&c=Article&cid=FT30414MGWC, Jan. 14, 2002.

EAN International, Uniform Code Council, Inc., *EAN.UCC White Paper on Radio Frequency Identification*, Nov. 1999.

Sanjay Sarma et al., *White Paper–The Networked Physical World*, MIT Auto–ID Center, Oct. 1, 2000.

John Stermer, *Radio Frequency ID: A New Era for Marketers?*, Consumer Insight, Winter 2001.

Mary Ann Falkman editor, *RFID smart labels track chilled foods door to door*, Packeting Digest, Nov. 2000.

Cheryl Rosen, *RFID Chips Put To The Test*, Informationweek.com, http://www.informationweek.com/story/IWK20010628S0008, Jul. 2, 2001.

M–Lab –A Joint Initiative of ETH Zurich and HSG, *The Mobile and Ubiquitous Computing Lab —Project Plan*, www.m–lab.ch, English version 1.02e, St. Gallen/Zurich, Jun. 21, 2001.

Rachel Melcer, *P&G's Vision*, Business Courier, May 18, 2001.

Elgar Fleisch et al., *From computing visions to show cases*, M–Lab, First M–Lab Steering Committee Meeting, Nov. 22–23, 2001, Zurich.

Charles J. Murray, *Motorola cuts bar code replacement effort*, EE Times, Nov. 16, 2001.

Savi Technology Inc. Press Release, *CHEP to deploy Savi Technology's Asset Management Software*, Nov. 6, 2001.

Jay Wrolstad, *American Airlines Deploys Wireless System to Monitor Cargo*, CRNDaily.com, Oct. 12, 2001.

Jay Wrolstad, *Wireless tags help grocers deliver fresh food*, CRMDaily.com, Oct. 2, 2001.

SAMSys, Inc. press release, *International Paper selects SAMSys Technologies as primary RFID reader supplier*, Jan. 5, 2001.

Infineon press release, *Infineon enters fast growing "smart label" market with my–d, defines new paradigm for cost effective radio frequency identification solutions*, Sep. 11, 2001.

MIT Auto–ID Center, MIT–AUTOID–WH–001, "The Networked Physical World", MIT Auto–ID Center, Dec. 2000.

David L. Brock, MIT Auto–ID Center, MIT–AUTOID–WH–002, "The Electronic Product Code", Jan. 2001.

Auto–ID Center, Technical Manual, "The Object Name Service", Version 0.5 (Beta), Oat Systems & MIT Auto–ID Center, Feb. 1, 2002.

KnowNow Product Brief: "KnowNow Architecture Overview", 2002.

Segall et al., "Content Based Routing with Elvin4" Jun. 2000.

White Paper, SAP® Consumer Products, From Demand Planning to Vendor Managed Inventory with SAP APO. "DRP and VMI for the Consumer Products Industry", 1999.

\* cited by examiner

ITEM TRACKING SYSTEMS AND REAL-TIME INVENTORY MANAGEMENT

BACKGROUND

This invention relates to item tracking systems and inventory management.

Supply chain management (SCM) software such as the SCM solutions provided by SAP AG of Walldorf, Germany, enable a user to manage materials, information, and finances as they move in a process from a supplier to a manufacturer to a wholesaler to a retailer. The SCM software generally implements algorithms for determining the best means to fill an order and also includes databases for tracking the physical status of the goods, the management of materials, and financial information.

Inventory management is a component of most SCM systems. Inventory management enables suppliers to keep track of how much inventory they have and how much inventory they have distributed to particular retailers. Periodically, the retailer reports to the supplier the current inventory level of the store. Based on the report, the supplier determines whether the store inventory needs to be replenished.

Typically, suppliers and retailers develop a planning schedule of how often the retailers will report to the supplier. For example, every Thursday, the retailer reports the current inventory level of the store and replenishment planning occurs. On Friday, any new inventory arrives at the store in time for the weekend shoppers.

SUMMARY

The present invention provides methods and apparatus, including computer program products, for inventory management.

In general, in one aspect, a monitoring system monitors the state of tagged items located within an inventory and sends an event to an event router when an item is added to or removed from the inventory. The event router receives the event from the monitoring system and sends the event to one or more item tracking systems. The item tracking systems receive the event and update stored information about the item to reflect the event.

In general, in another aspect, a monitoring system monitors the state of tagged items located within an inventory and sends an event to an event router when an item is added to or removed from the inventory. An event router receives the event from the monitoring system and sends the event to a second computer program. The second computer program receives the event and determines whether to send an alert to a first computer program. Upon receiving an alert from the second computer program, the first computer program determines whether replenishment of the inventory is needed.

In general, in another aspect, a monitoring system monitors the state of tagged items located within an inventory and generates an event when an item is added to or removed from the inventory. The monitoring system sends a unique digital identifier for the item to a mapping component. The mapping component uses the unique digital identifier to locate an event router from among a plurality of event routers. The monitoring system sends the event to the located event router. The event router receives the event and sends the event to one or more subscribers.

In general, in another aspect, a monitoring system monitors the state of tagged items located within an inventory and sends an event to an event router when an item is added to or removed from the inventory. The event router receives the event from the monitoring system and sends the event to an item tracking system and to a second computer program. The item tracking system receives the event and updates stored information about the item to reflect the event. The second computer program receives the event and determines whether to send an alert to a first computer program.

In general, in another aspect, a monitoring system monitors the state of tagged items located within an inventory and generates an event when an item is added to or removed from the inventory. The monitoring system sends a unique digital identifier for the item to a mapping component. The mapping component uses the unique digital identifier to locate an event router from among a plurality of event routers. The monitoring system sends the event to the located event router. The event router receives the event and sends the event to an item tracking system and to a second computer program. The item tracking system receives the event and updates stored information about the item to reflect the event. The second computer program receives the event and determines whether to send an alert to a first computer program.

The invention can be implemented to realize one or more of the following advantages. A system in accordance with the invention enables adaptive real-time inventory management. Instead of receiving periodic reports of aggregated inventory changes, the system enables inventory changes to be reported real-time and without human intervention. Instead of replenishment planning occurring only according to a fixed schedule, the timing of replenishment planning can be adaptive, occurring more or less frequently depending on the reported real-time inventory levels.

The details of one or more embodiments of the invention are set forth in the accompanying drawings and the description below. Other features and advantages of the invention will become apparent from the description, the drawings, and the claims.

DESCRIPTION OF DRAWINGS

Like reference symbols in the various drawings indicate like elements.

DETAILED DESCRIPTION

Figure 1:
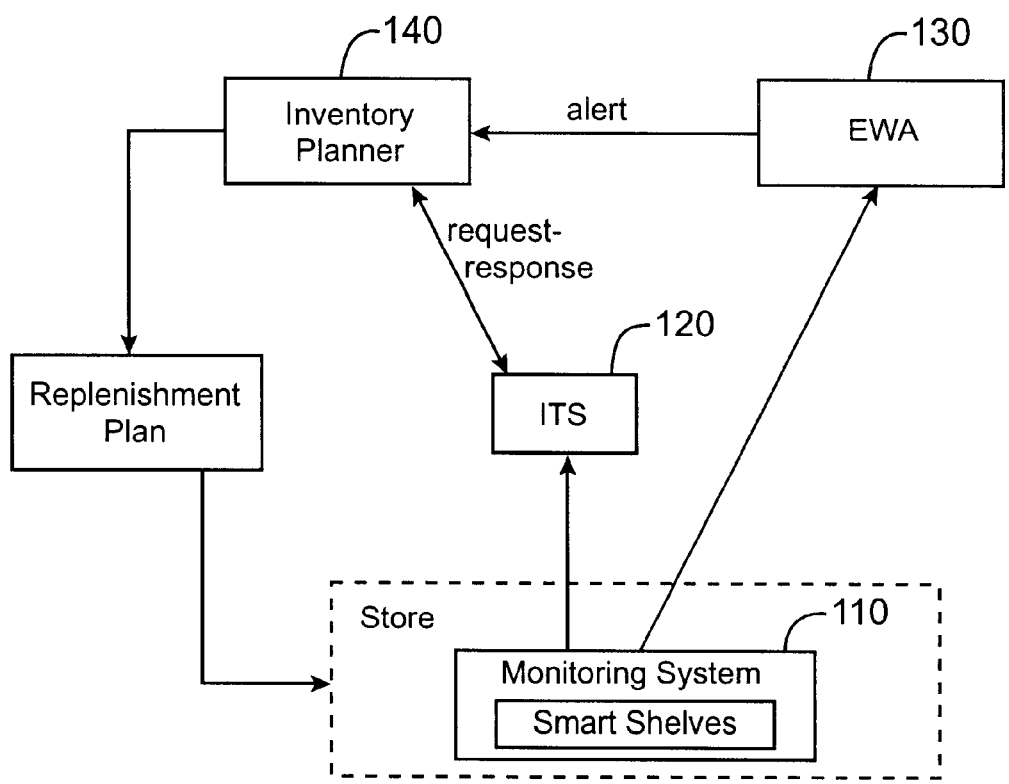
FIG. 1 is a block diagram of the basic structure of an inventory management system implemented with an item tracking system in accordance with the invention.

FIG. 1 illustrates a retail location in relation to an item tracking system (ITS) used as part of an inventory management system. The retail location is a store. The store has inventory that includes tagged items. When tagged items are brought into or removed from the store, this can be detected by a monitoring system 110.

A tagged item is a tangible item that carries or is bound to a self-identifying tag. The tag might be associated with a single item or it might be associated with a collection of items, by being bound to a container containing the items, for example.

Generally, the tag will be an RFID (radio frequency identification) tag, but it need not be based on RF technology. Moreover, the tag can be passive (containing no internal power source for communications and data transmission) or active; and it can have processing capacity or not. A tag is a digitally identifiable tag, meaning that the tag has the property that a unique digital identifier (UID) can be read directly from the tag using some kind of tag reader. Some digitally identifiable tags can also be written to.

One UID system is the ePC (electronic product code) system developed by the MIT Auto-ID Center. An ePC is a number that can, be used to identify a physical item. As currently defined, an ePC has 96-bits, partitioned into an 8-bit header and three data fields: manufacturer, product class, and serial number. The manufacturer field uniquely distinguish one manufacturer from another. For a given manufacturer, the product class field uniquely distinguish one product class from another. And the serial number field uniquely distinguishes one particular item from another item of the same product class and manufacturer. In this way, the ePC is inherently hierarchical in nature, and certain portions of the ePC number can be masked to control the level of specificity of the ePC number. For example, if an application only wants to know about the tracking information at the manufacturer level (e.g., which locations contain products manufactured by Spalding?), then the product class and serial number bits can be masked. UIDs other than ePCs can be used similarly.

Tagged items can be tracked using an ITS of the kinds described in commonly-owned U.S. patent applications Ser. No. 10/137,207 and Ser. No. 60/353,198, the disclosures of which are incorporated here by reference. Such an ITS maintains information about tagged items including the location, status and attributes of the items. An ITS can receive the information real-time from a variety of sources including other ITSs, other applications, and tag readers located on smart shelves, manufacturing lines, loading docks, and other locations. An ITS maintains a virtual world model where real items and other information are represented and made available for use by other systems and by applications.

Normally, a local ITS serves a single enterprise or a portion of that enterprise. An ITS can aggregate information from multiple other ITSs. A shared ITS can combine information from multiple ITSs belonging the different enterprises.

An ITS includes real time input processing logic, data structures and persistent storage, an interface for queries, and communications connections between the query interface, the persistent storage, and the input processing logic.

The real time input processing logic accepts messages from tag readers, existing ERP systems, and other ITS systems. The messages can represent creation of physical or logical items, or changes in the disposition or status of these items. The messages can be in XML or other format. The input processing logic interprets the incoming messages, consults the stored data, undertakes the appropriate action based on the message content and the stored data, updates the data structures as specified, and potentially returns error messages or other reports to the source of the message.

The data structures and persistent storage is a combination of software and hardware that records and maintains a representation of the relationships, states and histories of logical and physical items tracked by the ITS. For example, the data structures may record that a certain unique tag corresponds to a specific bottle of detergent. The data structures may also record that the detergent is part of a certain inventory (a logical item with a unique ID) The location of the detergent item may be periodically updated in response to real-time messages and software action from the input processing logic. The data structures and persistent storage preserve the data structures over any hardware of software failures. Any robust method of building persistent storage can be used; for example, one can use software database technology and magnetic disk drives to record information in a non-volatile manner.

The interface for queries provides the interface between an ITS and outside enterprise software applications.

The monitoring system 110 includes multiple tag readers positioned at one or more locations within the store. The monitoring system 110 also includes memory that stores the current state of each item in the inventory. The state indicates whether the item exists at the given location or has been removed from the location. The monitoring system 110 also includes computer logic that determines when the state of the item has changed, e.g., when the item has been added or removed from the given location.

The logic can be further configured to send an update whenever it detects a change in the state of an item. The inventory update can take the form of an event that includes the ePC of the item, the ePC of the tag reader, and a timestamp. The event can also include an IN/OUT parameter that specifies whether the change is an addition or a removal of the item.

In one implementation, the monitoring system 110 includes one or more smart shelves. Smart shelves are shelves that are capable of reporting when physical items are added to or removed from the shelf. A smart shelf contains multiple tag readers positioned at one or more locations on the shelf. A smart shelf also includes computer logic for determining whether an item has been added to or removed from the inventory.

An ITS 120 maintains tracking information for multiple items including the items belonging to the store inventory. Whenever items enter and leave the store, the ITS receives an event from the monitoring system 110 and updates its data storage to reflect the event.

An inventory planner 140 —a computer program solution —normally operates on a periodic schedule to perform inventory management functions. In the operations that relate to the store, the inventory planner 140 retrieves inventory data from the ITS 120 and determines whether to replenish the store inventory. The inventory planner 140 can receive alerts from an early warning agent (EWA) 130 that can cause the inventory planner to perform at least some inventory management functions, at least in relation to the store, outside of its normal periodic schedule. In particular, the EWA 130 can send an alert to the inventory planner 140 to cause the inventory planner to determine whether replenishment of store inventory is needed. Whenever items enter and leave the store, and optionally even when they more from one part of the store to another, the EWA receives an event from the monitoring system 110. Using the information received in such events, the EWA determines when to send alerts to the inventory planner 140.

The Early Warning Agent

The EWA 130 includes logic for determining when to send an alert. The determination of whether to send an alert includes applying one or more rules to the information received in inventory updates. A rule specifies a certain condition and a certain action to be performed when the condition is met. For example, a rule can specify that an alert should be sent whenever the inventory level drops below a specific value.

The EWA 130 can apply a pre-determined set of rules, or alternatively, the EWA 130 can include artificial intelligence logic that enables the EWA 130 to adapt its behavior in response to current or historical inventory patterns. The artificial intelligence logic enables the EWA to estimate potential variation in inventory levels in the near future in order to identify potentially risky situations early enough to allow for corrective measures. For example, initially the rules may specify that an alert should be fired when the inventory drops below 10. However, if the EWA 130 detects that it sends alerts much more frequently during the summer season than during other seasons, the EWA 130 may adapt to this seasonal variation by increasing the threshold from 10 to 20 during the summer season so that the inventory planner 140 is notified earlier of the impending inventory shortage. This adaptive behavior occurs with minimal human intervention, and with minimal need of parameter adjustment or any other kind of manual calibration.

The EWA 130 can retrieve and analyze current and historical inventory data to detect trends such as deviations between planned replenishment and actual replenishment and to build a predictive model of future inventory needs. These trends and predictions can be determined using linear regression, classification and regression trees, or other stochastic algorithms.

In one implementation, the EWA 130 estimates the potential variation for each planned replenishment or consumption activity that may affect the inventory (e.g., given historical performance data, it estimates that a planned truckload of 12 oz Bottles from Bob's Bottles will arrive any time within 4 hours prior to 6 hours after the planned delivery time, with a quantity that is between 95% and 100% of the requested quantity). The EWA 130 compares the promised and actual delivery time for various quantities of inventory delivered in the past to generate predictions for actual delivery dates and quantities for future replenishment activities that are planned but not yet completed. The EWA 130 combines the estimates of potential variation for several individual activities into an estimate of the potential variation for an entire inventory. These algorithms can be implemented using decision trees such as classification and regression trees.

In another implementation, instead of considering individual activities, the EWA 130 builds the predictive model based on aggregate data that represents cumulative levels of replenishment and consumption. These algorithms can be implemented using a probabilistic inference model such as conditional Gaussian approximation.

Further details regarding the algorithms used by the EWA 130 can be found in commonly-owned, co-pending U.S. patent application for Inventory Early Warning Agent, attorney docket no. 13915-015PO1, filed May 31$^{st}$, 2002, the contents of which are incorporated by this reference.

Inventory Planner

The inventory planner 140 can be any application that generates inventory replenishment plans. One such inventory planner 140 is the Advanced Planner and Optimizer (APO) available from SAP AG.

The inventory planner 140 includes logic for generating replenishment plans. The logic includes logic for receiving an alert from the EWA 130 and, in response to the alert, determining whether replenishment is needed.

In one implementation, the inventory planner 140 generates replenishment plans for an entire inventory. An EWA 130 monitors a portion of the inventory. Multiple EWAs 130 can be combined to cover the entire inventory. An alert pertaining to one portion of the inventory triggers the inventory planner 140 to make a determination as to whether the planned replenishment for the entire inventory needs to be re-planned.

The determination can include retrieving inventory data from the ITS 120 and determining or forecasting demand based on the retrieved inventory data. For example, a trend of high demand for product X may cause the inventory planner 140 to plan for not only more product X but also more product Y, a product for which product X is known to be a leading indicator.

Figure 2:
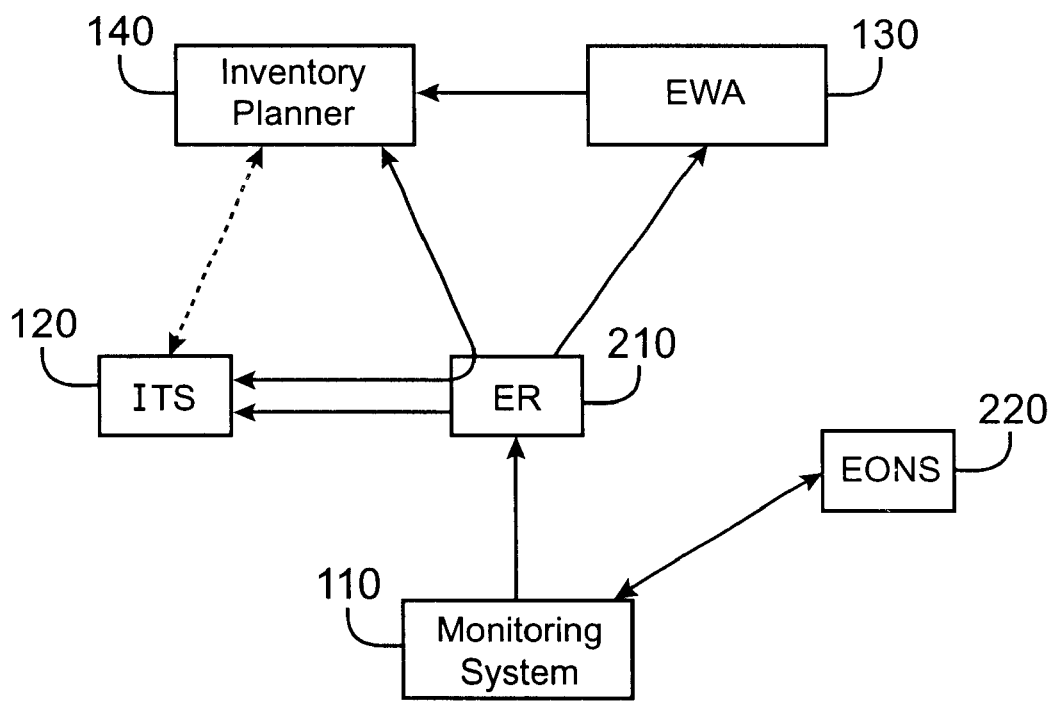
FIG. 2 is a block diagram of an implementation that uses event routing.

FIG. 2 is a block diagram of an implementation of the invention that uses event routing. An event routing middleware such as an event router (ER) 210 distributes various entities, for example, between the monitoring system 110, the ITS 120, the EWA 130 and the inventory planner 140. One such event router, the KnowHow® event router available from KnowHow Incorporated, of Mountain View, CA supports Internet-based event routing using a publish-subscribe model.

Events are messages that are passed from one software entity to another. Events can be used to notify the recipient of the event about some occurrence or to send a query to the recipient. Events can be categorized according to topics. A software entity may only be interested in events pertaining to certain topics. The software entity can subscribe to only certain topics and it will only receive events pertaining to those topics and not to others.

Figure 3:
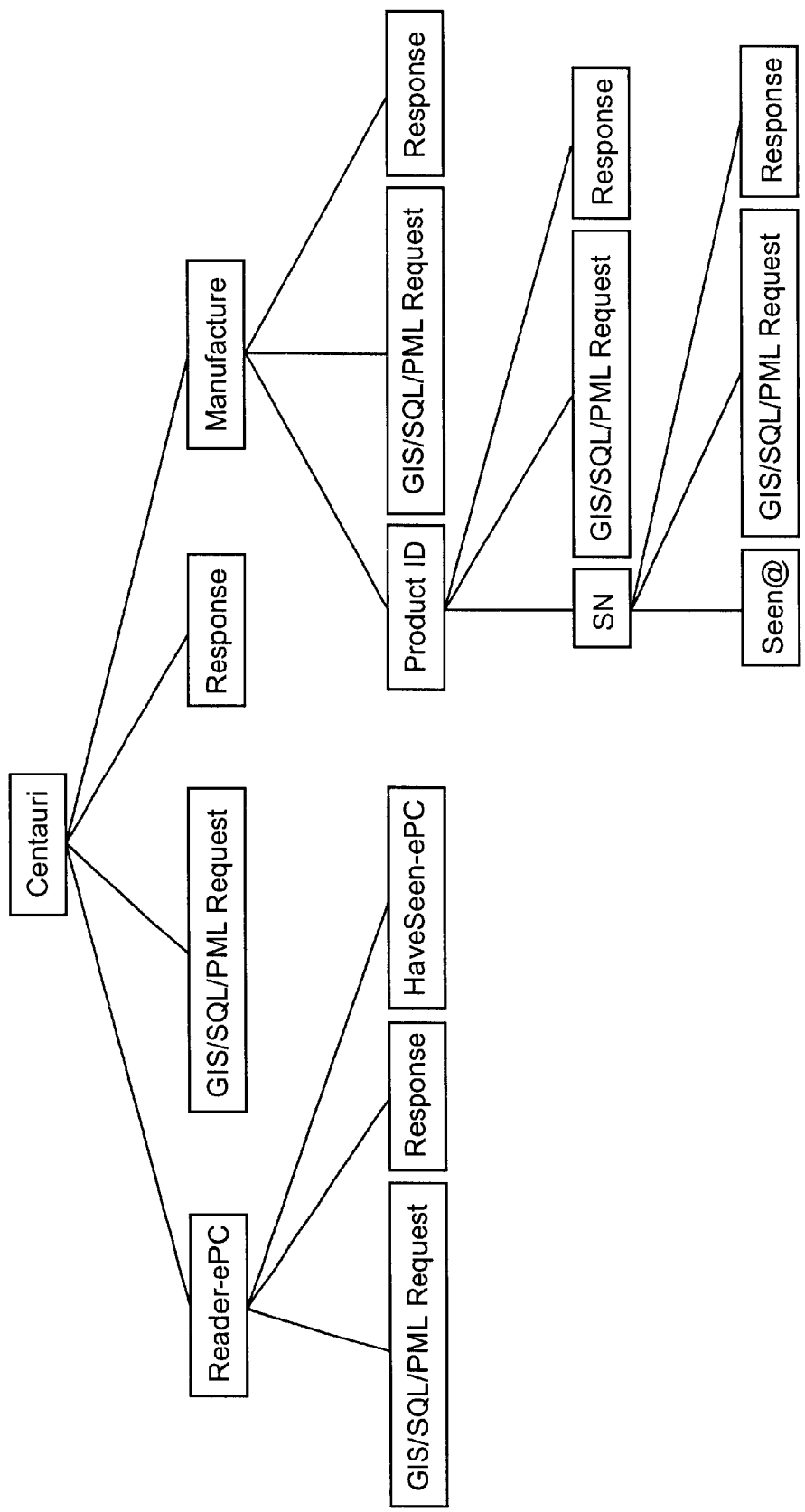
FIG. 3 is a diagram of an exemplary topic structure for event routing.

FIG. 3 shows a topic structure based on the structure of an ePC. A separate topic is created for each of the data fields of the ePC, namely, the manufacturer, product class and serial number. A separate topic is also created for events pertaining to readers.

An event router has a given topic set and each topic has an address, e.g., a URL. An event can be published to a topic by sending the event to the address for that topic. To determine the URL of the appropriate topic to publish an event to, a publishing entity such as the monitoring system 110 (FIG. 2) can consult an extended object naming service (EONS) 220. An EONS 220 maintains mappings between item ePCs (or a reader ePCs) and one or more ERs, along with their corresponding topics. An EONS takes as input an ePC of an item (or reader) and returns the URL(s) for one or more identified topics. The EONS 220 can be implemented by extending a conventional ONS such as the ONS developed by Oat Systems and the MIT Auto-ID Center, which is further described in the Object Name Service Technical Manual (published by MIT Auto-ID Center). Conventional object naming systems are similar to and are based on the well-known Domain Name System (DNS) for the Internet.

In operation, the monitoring system 110 identifies that an item has been added or removed from the inventory. The monitoring system 110 generates an event and then consults the EONS 220 to determine where to send the event. The monitoring system 110 provides the EONS with the ePC of the item and the ePC of the reader and receives back from the EONS the URLs for the item topic and the reader topic. The monitoring system 110 then sends the event to both topics.

The ER(s) for the item topic and the reader topic routes the events to one or more subscribers. For example, the ITS can be a subscriber to the item topic and the EWA can be a subscriber to the reader topic. The EWA receives the event from the ER and determines whether to send an alert to the inventory planner.

If an alert is sent, this triggers the inventory planner to re-plan the replenishment of the inventory. To obtain the current data for the inventory, the inventory planner can send an event to the ER requesting inventory data. The ER then routes the event to the ITS, which responds by sending the requested inventory data to the inventory planner.

Figure 4:
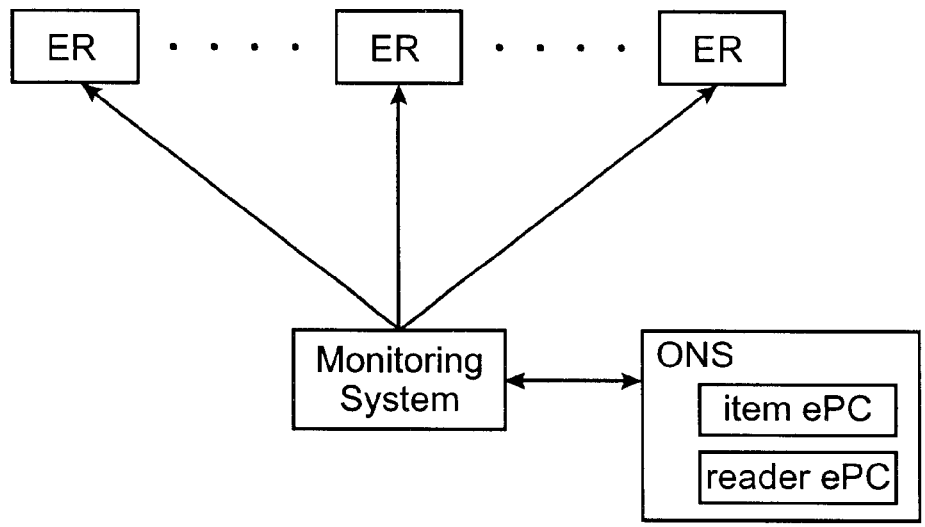
FIG. 4 is a block diagram of an object naming service for locating event routers.

As shown in FIG. 4, an EONS can maintain mappings between multiple tagged items (or readers) and multiple ERs. As discussed above, the mappings support multiple keys, including an item key and a reader key. The EONS can service multiple monitoring systems 110 and other tag reader applications. In one implementation, the EONS is a distributed subsystem that includes mapping information, query servers for responding to queries requesting information location, and name resolvers that can receive an ePC and resolve the ePC into an ER location.

Figure 5:
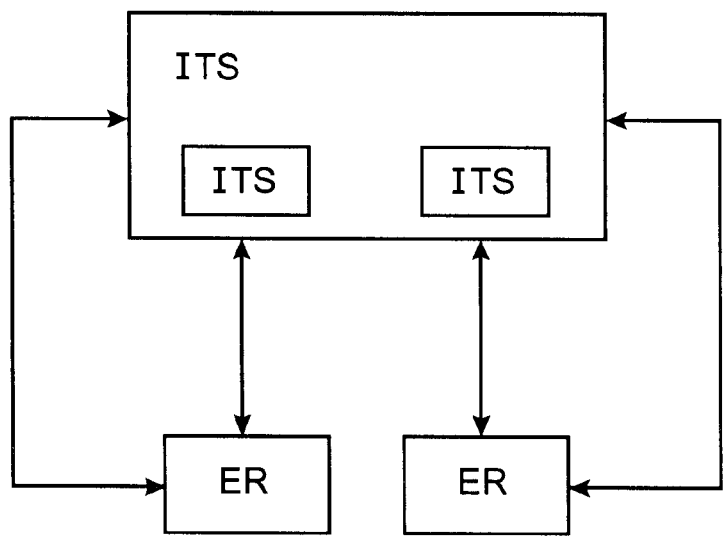
FIG. 5 is an illustration of using an event router to distribute between multiple item tracking systems.

As shown in FIG. 5, a particular ER can distribute to multiple ITSs (as well as to other subscribers) and a particular ITS can subscribe to multiple ERs. A user can define a desired scope for each ITS and configure the distribution scheme accordingly.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or-that includes a front-end component, such as a client computer having a graphical user interface or an Internet browser, or any combination of them. The components of the system can be connected by any form or medium of digital data communication.

The invention has been described in terms of particular embodiments. Other embodiments are within the scope of the following claims. For example, steps of the invention can be performed in a different order and still achieve desirable results. The invention can be applied to other scenarios besides inventory management. For example, the invention can be applied in the production context where production is planned according to the receipt of customer orders. An EWA can be used to alert the production planner when orders have been made. Accordingly, other embodiments are within the scope of the following claims.

What is claimed is:

1. Apparatus comprising:
   a monitoring system including:
      a tag reader configured to read tags from tagged items located within an inventory; and
      means for detecting and reporting that an item has been added to or removed from the inventory;
   one or more item tracking systems, each item tracking system including:
      a memory that stores information about tagged items;
      input processing logic configured to process messages containing information about changes in the location of a tagged item and to store the information in the memory; and
      a query interface configured to respond to queries about the tagged items; and an event router including:
         a registry of subscribers, the subscribers including the one or more item tracking systems; and
         means for receiving an event from the monitoring system and sending the event to the one or more item tracking systems.

2. The apparatus of claim 1, wherein the event includes a unique digital identifier for an item, a unique digital identifier for a reader and a timestamp.

3. The apparatus of claim 1, wherein the event further includes a parameter that indicates whether the item has been added to the inventory or whether the item has been removed from the inventory.

4. Apparatus comprising:
   a monitoring system including:
      a tag reader configured to read tags from tagged items located within an inventory; and
      means for detecting and reporting that an item has been added to or removed from the inventory;
   a first computer program configured to determine whether replenishment of the inventory is needed;
   a second computer program configured to determine whether to send an alert to the first computer program; and an event router including:
  a registry of subscribers, the subscribers including the first computer program; and
  means for receiving an event from the monitoring system and sending the event to the second computer program.

5. The apparatus of claim 4, wherein the event includes a unique digital identifier for an item, a unique digital identifier for a reader and a timestamp.

6. The apparatus of claim 4, wherein the event further includes a parameter that indicates whether the item has been added to the inventory or whether the item has been removed from the inventory.

7. The apparatus of claim 4, wherein the second computer program is configured to apply a pre-determined set of rules to determine whether to send the alert.

8. The apparatus of claim 4, wherein the second computer program is further configured to analyze inventory data to detect trends in the data.

9. Apparatus comprising:
a monitoring system including:
  a tag reader configured to read tags from tagged items located within an inventory; and
  means for detecting and reporting that an item has been added to or removed from the inventory;
a plurality of event routers, each event router including:
  a registry of subscribers; and
  means for receiving an event from the monitoring system and sending the event to one or more of the subscribers; and
a mapping component including:
  a memory that stores mappings between an item identifier and an event router and between a reader identifier and an event router; and
  means for receiving an item or reader identifier from the monitoring system and using the item or reader identifier to locate an event router.

10. Apparatus comprising:
a monitoring system including:
  a tag reader configured to read tags from tagged items located within an inventory; and
  means for detecting and reporting that an item has been added or removed from the inventory;
an item tracking system including:
  a memory that stores information about tagged items;
  input processing logic configured to process messages containing information about changes in the location of a tagged item and to store the information in the memory; and
  a query interface configured to respond to queries about the tagged items;
a first computer program configured to determine whether replenishment of the inventory is needed; and
a second computer program configured to receive an event from the monitoring system and to determine whether to send an alert to the first computer program.

11. A system comprising:
a monitoring system including:
  a tag reader configured to read tags from tagged items located within an inventory; and
  means for detecting and reporting that an item has been added to or removed from the inventory;
an item tracking system including:
  a memory that stores information about tagged items;
  input processing logic configured to process messages containing information about changes in the location of a tagged item and to store the information in the memory; and
  a query interface configured to respond to queries about the tagged items;
a first computer program configured to determine whether replenishment of the inventory is needed;
a second computer program configured to receive an event from the monitoring system and to determine whether to send an alert to the first computer program;
an event router including:
  a registry of subscribers, the subscribers including the item tracking system, the first computer program and the second computer program; and
  means for receiving an event from the monitoring system and sending the event to one or more of the subscribers; and
a mapping component including:
  memory that stores mappings between an item identifier and an event router and between a reader identifier and an event router; and
  means for receiving an item identifier from the monitoring system and using the item identifier to locate an event router.

* * * * *